(12) United States Patent
Furukoshi et al.

(10) Patent No.: US 7,154,762 B2
(45) Date of Patent: Dec. 26, 2006

(54) POWER SOURCE APPARATUS

(75) Inventors: Ryuichi Furukoshi, Saitama (JP); Mizuki Utsuno, Saitama (JP)

(73) Assignee: Sanken Electric Co., Ltd., Saitama (JP)

( * ) Notice: Subject to any disclaimer, the term of this patent is extended or adjusted under 35 U.S.C. 154(b) by 251 days.

(21) Appl. No.: 10/530,339

(22) PCT Filed: Jan. 10, 2003

(86) PCT No.: PCT/JP03/00161

§ 371 (c)(1),
(2), (4) Date: Jul. 9, 2004

(87) PCT Pub. No.: WO03/061106

PCT Pub. Date: Jul. 24, 2003

(65) Prior Publication Data

US 2005/0219864 A1    Oct. 6, 2005

(30) Foreign Application Priority Data

Jan. 11, 2002 (JP) .............................. 2002-004490

(51) Int. Cl.
*H02M 3/335* (2006.01)
(52) U.S. Cl. ................. 363/16; 363/49; 363/21.16
(58) Field of Classification Search ................. 363/16, 363/20–21.18, 49, 97, 131; 323/314, 315, 323/280
See application file for complete search history.

(56) References Cited

U.S. PATENT DOCUMENTS 5,179,508 A    1/1993    Lange et al.
5,689,407 A    11/1997   Marinus et al.
6,252,783 B1   6/2001    Huh et al.
6,538,419 B1 * 3/2003    Allen et al. .................... 363/16
6,587,357 B1 * 7/2003    Halamik et al. .............. 363/20

FOREIGN PATENT DOCUMENTS

| EP | 0993105 A1 | 4/2000 |
| JP | 2000-270546 | 9/2000 |
| JP | 2001-327165 | 11/2001 |
| JP | 2001-333579 | 11/2001 |

* cited by examiner

*Primary Examiner*—Jessica Han
(74) *Attorney, Agent, or Firm*—Townsend and Townsend and Crew

(57) ABSTRACT

An input voltage is applied by an NMOS transistor (34) driven by an oscillation circuit (60) to a primary winding (32a) of a transformer (32) intermittently. A voltage induced in a secondary winding (32b) is rectified and smoothed by an output circuit (91) to be an output voltage. In a normal mode where no standby signal is supplied, the oscillation circuit (60) controls the NMOS transistor (34) so that the output voltage is stabilized at a predetermined first value. When a standby signal is supplied, a detection circuit (100) detects the standby signal and transmits the detection to a starting circuit (40). The starting circuit (40) starts the oscillation circuit (60) when a voltage of a capacitor (33) reaches an upper limit, and stops the oscillation circuit (60) when this voltage lowers below a lower limit. This upper limit is lower than an upper limit at which the starting circuit (40) starts the oscillation circuit (60) in the normal mode.

6 Claims, 9 Drawing Sheets

US 7,154,762 B2

POWER SOURCE APPARATUS

TECHNICAL FIELD

The present invention relates to a power source apparatus, and particularly, relates to a DC-DC converter.

BACKGROUND ART

There is known a power source apparatus which performs DC-DC (direct current-direct current) conversion, and has a normal mode and a standby mode. Such a power source apparatus outputs a lower voltage when in the standby mode than in the normal mode.

FIG. 8 is a diagram showing an example of a conventional structure of such a power source apparatus. FIGS. 9(a) to (d) are time charts for explaining the operation of the power source apparatus shown in FIG. 8.

In the normal mode, that is, when a standby signal SB is not supplied from outside, the base of a transistor 16 of the power source apparatus shown in FIG. 8 is set at a low level (hereinafter referred to as "L"). In the normal mode, when an input voltage Vin is applied between input terminals IN1 and IN2, a capacitor 3 is charged via a starting resistor 1. The speed at which the capacitor 3 is charged depends upon a time constant which is determined by the resistance value of the starting resistor 1 and the capacitance of the capacitor 3.

When charging of the capacitor 3 goes on, and as shown in FIG. 9(a), the voltage of a connection point (node N1) of the capacitor 3 and the starting resistor 1 reaches $Vcc_{on}$, a starting circuit 6 supplies electricity stored in the capacitor 3 to an oscillation circuit 7 (FIG. 9(b)). When supplied with electricity, the oscillation circuit 7 drives the gate of an NMOS 4 by voltage, to turn on/off the NMOS 4.

The NMOS 4 flows a current through a primary winding 2a of a transformer 2 when it is turned on, and cuts off the current flowing through the primary winding 2a when it is turned off. As a result, an AC (alternating current) voltage is caused in a secondary winding 2b of the transformer 2. A diode 9 rectifies the voltage caused in the secondary winding 2b of the transformer 2. A capacitor 10 smoothes the rectified voltage, and generates a DC output voltage Vout to be supplied to a load.

Resistors 11 and 12 generate a voltage proportional to the DC output voltage Vout at the connection point of them. An error amplifier 13 flows a current corresponding to voltage obtained by amplifying a difference between this voltage and a predetermined reference voltage through a resistor 15 and a light emitting element 14. As a result, the light emitting element 14 emits light. When the light emitting element 14 emits light, a current representing the value of the DC output voltage Vout flows through a light receiving element 8.

The oscillation circuit 7 determines timings (specifically, frequencies or duty ratio, for example) at which the NMOS 4 is turned on and off in accordance with the amount of the current flowing through the light receiving element 8, and turns on and off the NMOS 4 at the determined timings. By this operation, the oscillation circuit 7 controls the DC output voltage Vout to be a constant value $V_{out1}$ shown in FIG. 9(c).

The voltage of the node N1 lowers by turning on the NMOS 4. On the other hand, a voltage $Vcc_{off}$ is preset as a minimum value to be reached by the voltage of the node N1 as a result of the starting circuit 6's supplying electricity to the oscillation circuit 7. When the voltage of the node N1 lowers below $Vcc_{off}$, the oscillation circuit does not operate.

Therefore, in the normal mode, the voltage of the node N1, i.e., the voltage to be supplied to the starting circuit 6 does not lower below the voltage $Vcc_{off}$. In the normal mode, since the voltage of the node N1 exceeds $Vcc_{off}$, the oscillation circuit 7 does not stop, and the DC output voltage Vout is controlled to be stabilized at a desired value. The voltages $Vcc_{on}$ and $Vcc_{off}$ are set so that the difference between them may be sufficiently large, in order to control the power source apparatus shown in FIG. 8 to operate stably.

A tertiary winding 2c of the transformer 2 causes an inductive voltage when a voltage is applied to the primary winding 2a intermittently. As a result of this inductive voltage being caused, a current flows through the node N1 via a diode 5, and the capacitor 3 is charged.

As shown in FIG. 9(d), when a standby signal SB of a high level (hereinafter referred to as "H") is supplied to the base of the transistor 16, the power source apparatus shown in FIG. 8 becomes the standby mode. In the standby mode, the transistor 16 is turned on. When the transistor 16 is turned on, a Zener diode 17 reaches breakdown, and the voltage of an output terminal of the error amplifier 13 becomes a voltage almost equal to the breakdown voltage of the Zener diode 17. The light emitting element 14 emits light having an intensity representing the breakdown voltage. The light receiving element 8 receives light from the light emitting element 14, and flows a current having an intensity corresponding to the intensity of the received light. When the oscillation circuit 7 detects the current flowed by the light receiving element 8, it turns off the NMOS 4 so that a time period during which the NMOS 4 stays on in a unit time period becomes shorter than in the normal mode, for example. As a result, the amount of the current flowing through the primary winding 2a becomes smaller, and the DC output voltage Vout lowers.

In the standby mode, the amount of the current to flow from the tertiary winding 2c to the capacitor 3 also becomes smaller. Therefore, while the NMOS 4 is turned on and off repeatedly, the voltage of the node N1 lowers below $Vcc_{off}$, power supply to the oscillation circuit 7 is stopped, and the oscillation circuit 7 stops operating. Afterwards, when the starting resistor 1 charges the capacitor 3 and the voltage of the node N1 reaches $Vcc_{on}$ again, the starting circuit 6 resumes power supply to the oscillation circuit 7, and the oscillation circuit 7 resumes turning on/off the NMOS 4.

As explained above, according to the power source apparatus shown in FIG. 8, in the standby mode, the DC output voltage Vout lowers below the value at which it is stabilized in the normal mode. As a result, the voltage of the node N1 lowers below $Vcc_{off}$, and the oscillation circuit 7 operates intermittently. Thus, power consumption can be reduced.

However, according to the conventional power source apparatus shown in FIG. 8, in the standby mode, a time period required for the voltage of the node N1 to once lower to $Vcc_{off}$ and to rise again to $Vcc_{on}$ is long. Therefore, in the standby mode, the range of fluctuation of the DC output voltage Vout to be supplied to the load is large.

DISCLOSURE OF INVENTION

The object of the present invention is to provide a power source apparatus which supplies a less fluctuant DC voltage to a load, even in a standby mode.

To achieve the above object, a power source apparatus comprises: a conversion circuit (40, 60, 34, 32, 91, 100, 80) which performs conversion of an input voltage into an output voltage different from the input voltage; and a driving power source (33) which is charged with the input voltage to drive the conversion circuit (40, 60, 34, 32, 91, 100, 80), wherein:

in a case where a standby signal is not supplied from outside, the conversion circuit (40, 60, 34, 32, 91, 100, 80) performs the conversion so that the output voltage may be stabilized at a predetermined first value;

in a case where the standby signal is supplied from outside, the conversion circuit (40, 60, 34, 32, 91, 100, 80) performs the conversion so that the output voltage may be stabilized at equal to or lower than a predetermined second value which is lower than the predetermined first value, by controlling the output voltage to rise when a voltage of the driving power source (33) rises to a first charging voltage, and by controlling the output voltage to lower when the voltage of the driving power source (33) lowers to a second charging voltage; and a difference between the first and second charging voltages in the case where the standby signal is supplied is smaller than a difference between the first and second charging voltages in a case where the standby signal is not supplied.

According to this power source apparatus, the cycle by which the conversion circuit operates intermittently in a state where a standby signal is supplied is short, and fluctuation of the output voltage can be reduced.

The conversion circuit (40, 60, 34, 32, 91, 100, 80) may include:

a transformer (32a, 32b) which has a primary winding and a secondary winding which are inductively coupled to each other;

a switching circuit (40, 60, 34, 80) which applies the input voltage to the primary winding intermittently;

a rectifier circuit (91) which rectifies a voltage which is induced in the secondary winding; and a detection circuit (100) which detects that the standby signal is supplied.

In this case, the switching circuit (40, 60, 34, 80) may determine whether or not the detection circuit (100) detects the standby signal.

In a case where determining that the standby signal is not detected, the switching circuit (40, 60, 34, 80) may set timings of intermittence of the input voltage so that the output voltage may be stabilized at the predetermined first value.

And in a case where determining that the standby signal is detected, the switching circuit (40, 60, 34, 80) may stabilize the output voltage at equal to or lower than the predetermined second value, by starting applying the input voltage intermittently when the voltage of the driving power source (33) rises to the first charging voltage, and by stopping applying the input voltage when the voltage of the driving power source (33) lowers to the second charging voltage.

In this case, the power source apparatus may further comprise: a tertiary winding (32c) which is inductively coupled to the primary winding; and an auxiliary rectifier circuit (35) which rectifies a voltage induced in the tertiary winding (32c), and the driving power source (33) may also be charged with a voltage obtained by rectification by the auxiliary rectifier circuit (35).

The conversion circuit (40, 60, 34, 32, 91, 100, 80) may include:

a coil (111);

a switching circuit (40, 60, 34, 80) which applies the input voltage to the coil (111) intermittently;

a rectifier circuit (91) which rectifies a voltage induced in the coil (111); and a detection circuit (100) which detects that the standby signal is supplied.

In this case, the switching circuit (40, 60, 34, 80) may determine whether or not the detection circuit (100) detects the standby signal.

In a case where determining that the standby signal is not detected, the switching circuit (40, 60, 34, 80) may set timings of intermittence of the input voltage so that the output voltage may be stabilized at the predetermined first value.

And in a case where determining that the standby signal is detected, the switching circuit (40, 60, 34, 80) may stabilize the output voltage at equal to or lower than the predetermined second value, by starting applying the input voltage intermittently when the voltage of the driving power source (33) rises to the first charging voltage, and by stopping applying the input voltage when the voltage of the driving power source (33) lowers to the second charging voltage.

The power source apparatus may further comprise: an auxiliary coil (112) which is inductively coupled to the coil (111); and an auxiliary rectifier circuit (113) which rectifies a voltage induced in the auxiliary coil (112), and the driving power source (33) may also be charged with a voltage obtained by rectification by the auxiliary rectifier circuit (113).

The conversion circuit (40, 60, 34, 32, 91, 100, 80) may further include a feedback circuit (104, 105) which generates a feedback signal representing the output voltage.

In this case, the switching circuit (40, 60, 34, 80) may set timings of intermittence of the input voltage so that the output voltage may be stabilized at the predetermined first value, based on the feedback signal, in a case where it determines that the detection circuit (100) does not detect the standby signal.

The detection circuit (100) may control the feedback circuit (104, 105) so that a value represented by the feedback signal may be a predetermined value, in response to that the standby signal is supplied.

In this case, the switching circuit (40, 60, 34, 80) may determine whether or not the detection circuit (100) detects the standby signal, based on the value represented by the feedback signal.

In a case where the detection circuit (100) detects that the standby signal is supplied, said switching circuit (40, 60, 34, 80) may set timings of intermittence of the input voltage based on the value represented by the feedback signal so that the output voltage may be stabilized at equal to or lower than the predetermined second value, by starting intermittent application of the input voltage when the voltage of said driving power source (33) rises to the first charging voltage, and by stopping the application of the input voltage when the voltage of said driving power source (33) lowers to the second charging voltage.

The second charging voltage in the case where the standby signal is supplied and the second charging voltage in the case where the standby signal is not supplied may be substantially equal to each other.

BRIEF DESCRIPTION OF DRAWINGS

These objects and other objects and advantages of the present invention will become more apparent upon reading of the following detailed description and the accompanying drawings in which.

BEST MODE FOR CARRYING OUT THE INVENTION

First Embodiment

Figure 1:
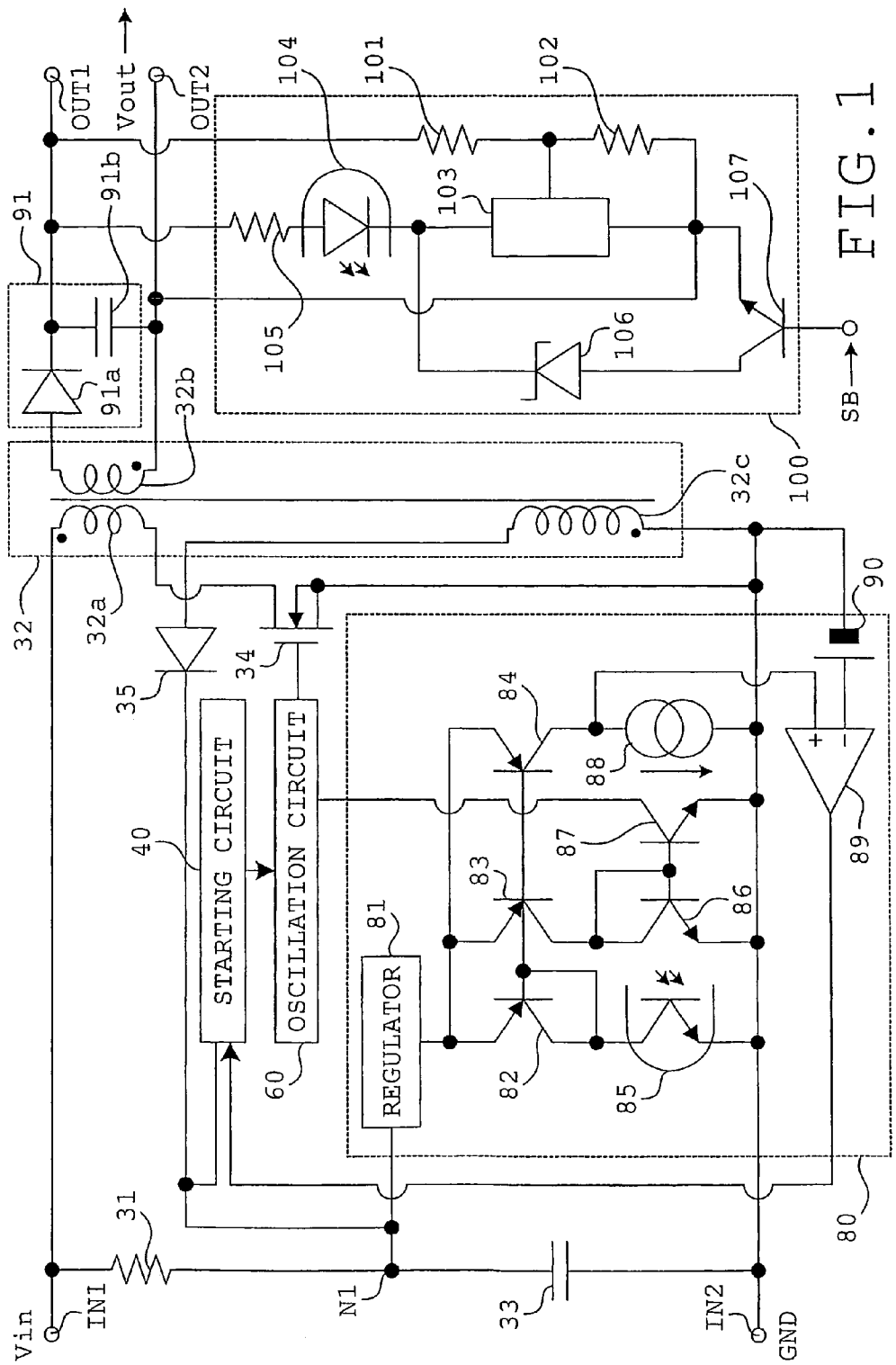
FIG. 1 is a diagram showing a structure of a direct current power source apparatus according to a first embodiment of the present invention.

FIG. 1 is a diagram showing the structure of a direct current (DC) power source apparatus according to a first embodiment of the present invention. This DC power source apparatus is one that can be switched between a normal mode and a standby mode. This DC power source apparatus comprises a starting resistor 31, a transformer 32, a capacitor 33, a starting circuit 40, an oscillation circuit 60, a determination circuit 80, an output circuit 91, and a detection circuit 100.

One end of the starting resistor 31 and one end of a primary winding 32a included in the transformer 32 are connected to an input terminal IN1 of this DC power source apparatus. The other end of the starting resistor 31 is connected to one electrode of the capacitor 33. The other electrode of the capacitor 33 is connected to an input terminal IN2. The input terminal IN1 and the input terminal IN2 are connected to a power source (not shown). This power source supplies a ground voltage GND to the input terminal IN2, and supplies a power source voltage to the input terminal IN1. The starting resistor 31 provides the capacitor 33 with a charging current supplied from this power source.

The transformer 32 includes the primary winding 32a, a secondary winding 32b, and a tertiary winding 32c which are inductively coupled to one another. The other end of the primary winding 32a is connected to the drain of an N-channel MOS (Metal-Oxide-Silicon) type field effect transistor (hereinafter, referred to as NMOS) 34. The source of the NMOS 34 is connected to the input terminal IN2. One end of the tertiary winding 32c is connected to a connection point (node N1) of the capacitor 33 and the starting resistor 31 via a diode 35. The other end of the tertiary winding 32c is connected to the input terminal IN2. The tertiary winding 32c serves as an auxiliary coil which generates an electric current, and the diode 35 rectifies the electric current generated by the tertiary winding 32c and charges the capacitor 33 with this rectified current.

The starting circuit 40 is connected to the node N1, the oscillation circuit 60 is connected to the starting circuit 40, and a gate of the NMOS 34 is connected to the oscillation circuit 60. The oscillation circuit 60 starts operating when supplied with electricity, and controls the level of a DC output voltage by switching on or off the NMOS 34. The starting circuit 40 is a circuit which supplies electricity to the oscillation circuit 60. The determination circuit 80 is further connected to the node N1. The determination circuit 80 is a circuit which determines whether or not a later-described feedback signal FB indicates that a later-described standby signal SB has been supplied, and transmits the determination result to the starting circuit 40.

Figure 2:
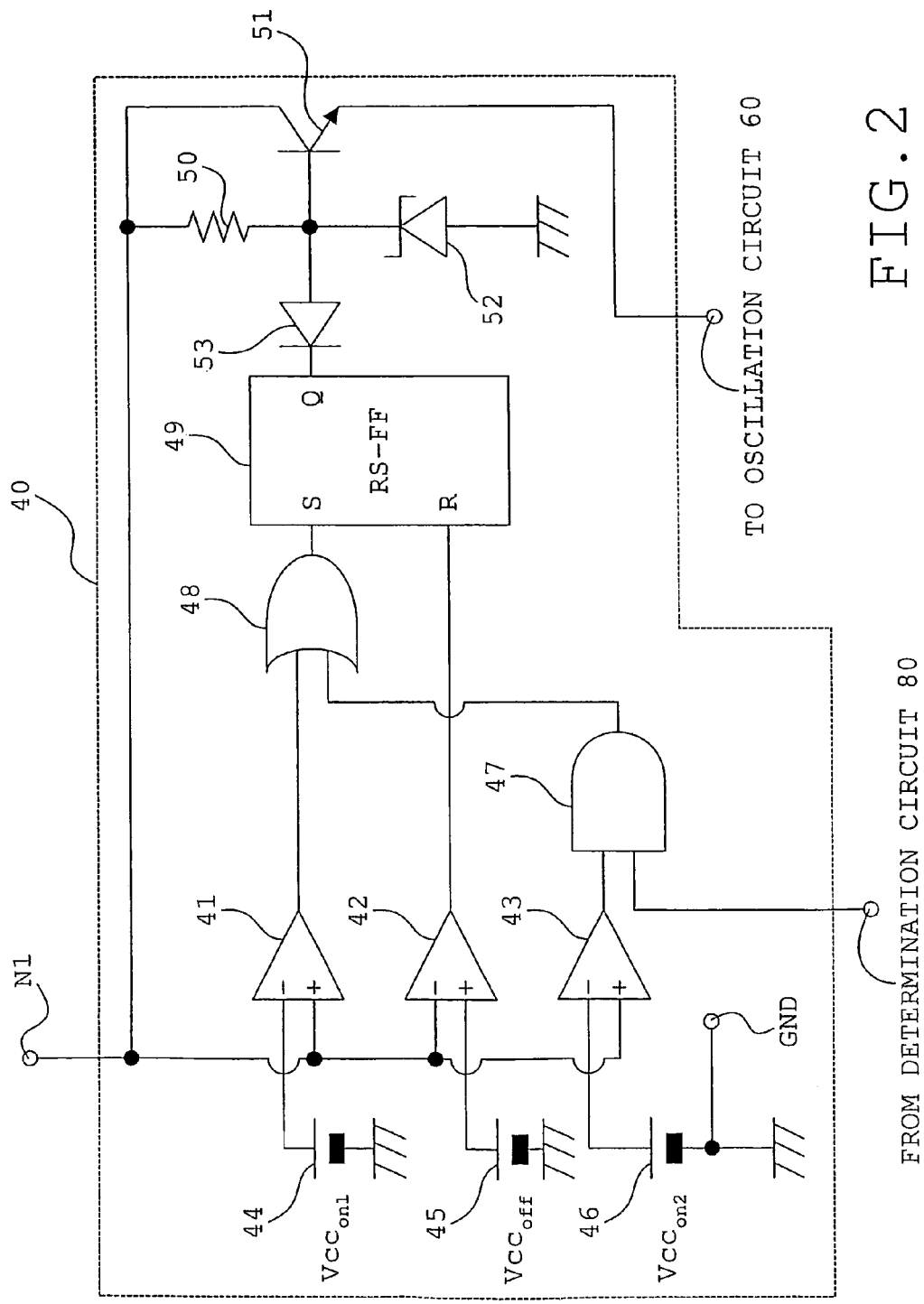
FIG. 2 is a diagram showing an example of a structure of a starting circuit shown in FIG. 1.

FIG. 2 is a diagram showing an example of the structure of the starting circuit 40 shown in FIG. 1. The starting circuit 40 shown in FIG. 2 comprises three comparators 41, 42, and 43, three power sources 44, 45, and 46, an AND gate 47, an OR gate 48, a reset-set flip-flop (hereinafter referred to as RS-FF) 49, a resistor 50, an NPN type transistor 51, and diodes 52 and 53.

A noninverting input terminal (+) of the comparator 41 is connected to the node N1, and an inverting input terminal (−) of the comparator 41 is connected to the power source 44 which generates a reference voltage $Vcc_{on1}$. The comparator 41 outputs a high level voltage (hereinafter referred to as "H") when the voltage of the node N1 is equal to or higher than the reference voltage $Vcc_{on1}$, and outputs a low level voltage (hereinafter referred to as "L") when the voltage of the node N1 is lower than the reference voltage $Vcc_{on1}$. A noninverting input terminal (+) of the comparator 42 is connected to the power source 45 which generates a reference voltage $Vcc_{off}$, and an inverting input terminal (−) of the comparator 42 is connected to the connection terminal N1. The comparator 42 outputs "H" when the voltage of the node N1 is equal to or lower than the reference voltage $Vcc_{off}$, and outputs "L" when the voltage of the node N1 is over the reference voltage $Vcc_{off}$.

A noninverting input terminal (+) of the comparator 43 is connected to the node N1, and an inverting input terminal (−) of the comparator 43 is connected to the power source 46 which generates a reference voltage $Vcc_{on2}$. The comparator 43 outputs "H" when the voltage of the node N1 is equal to or higher than the reference voltage $Vcc_{on2}$, and outputs "L" when the voltage of the node N1 is lower than the reference voltage $Vcc_{on2}$. The reference voltage $Vcc_{on2}$ is a voltage higher than the reference voltage $Vcc_{off}$ and lower than the reference voltage $Vcc_{on1}$.

An output terminal of the comparator 43 is connected to one input terminal of the two-input AND gate 47. The other input terminal of the AND gate 47 is supplied with a determination result from the determination circuit 80. An output terminal of the comparator 41 is connected to one input terminal of the two-input OR gate 48, and an output terminal of the AND gate 47 is connected to the other input terminal of the OR gate 48. An output terminal of the OR gate 48 is connected to a set terminal (S) of the RS-FF 49. An output terminal of the comparator 42 is connected to a reset terminal (R) of the RS-FF 49.

Further, one end of the resistor 50 and a collector of the NPN type transistor 51 are connected to the node N1. The other end of the resistor 50 is connected to a base of the transistor 51, a cathode of the Zener diode 52, and an anode of the diode 53.

An anode of the Zener diode 52 is grounded, and a cathode of the diode 53 is connected to an output terminal (Q) of the RS-FF 49. An emitter of the transistor 51 constitutes an output terminal of the starting circuit 40. When the RS-FF 49 outputs "H", the emitter of the transistor 51 supplies electricity to the oscillation circuit 60, and when the RS-FF 49 outputs "L", it stops supplying electricity to the oscillation circuit 60.

Figure 3:
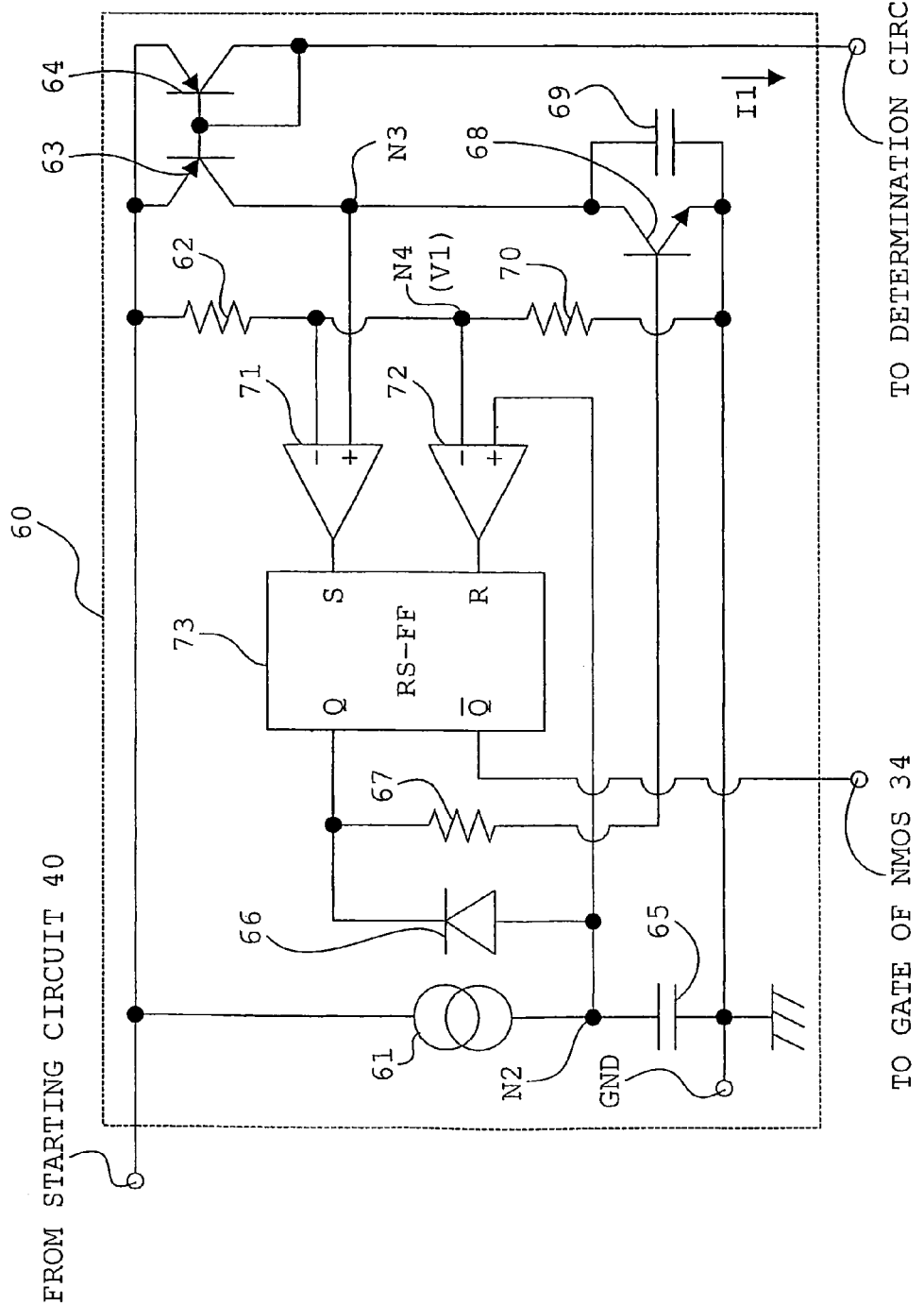
FIG. 3 is a diagram showing an example of a structure of an oscillation circuit shown in FIG. 1.

FIG. 3 is a diagram showing an example of the structure of the oscillation circuit 60 shown in FIG. 1. The oscillation circuit 60 shown in FIG. 3 comprises a constant current source 61 whose input terminal is connected to the output terminal of the starting circuit 40, a resistor 62 whose one end is connected to the output terminal of the starting circuit 40, two PNP type transistors 63 and 64 whose emitters are connected to the output terminal of the starting circuit 40, capacitors 65 and 69, a diode 66, resistors 67 and 70, an NPN type transistor 68, comparators 71 and 72, and a RS-FF 73.

An output terminal of the constant current source 61 is connected to one electrode of the capacitor 65, and the other electrode of the capacitor 65 is connected to the ground GND. An anode of the diode 66 is connected to a connection point (node N2) of the one electrode of the capacitor 65 and the constant current source 61, and a cathode of the diode 66 is connected to a base of the NPN type transistor 68 via the resistor 67. A collector of the transistor 68 is connected to a collector of the transistor 63 and to one electrode of the capacitor 69. An emitter of the transistor 68 and the other electrode of the capacitor 69 are connected to the ground GND.

One end of the resistor 70 is connected to the other end of the resistor 62, and the other end of the resistor 70 is connected to the ground GND. A connection point (node N3) of the collector 63, the collector of the transistor 68, and the one electrode of the capacitor 69 is connected to a noninverting input terminal (+) of the comparator 71. A connection point (node N4) of the resistor 62 and the resistor 70 is connected to inverting input terminals (−) of the comparators 71 and 72. A noninverting input terminal (+) of the comparartor 72 is connected to the node N2. A voltage V1 generated by the resistors 62 and 70 is input to the inverting input terminals (−) of the comparators 71 and 72.

An output terminal of the comparator 71 is connected to a set terminal (S) of the RS-FF 73, and an output terminal of the comparator 72 is connected to the reset terminal (R) of the RS-FF 73.

A positive phase output terminal (Q) of the RS-FF 73 is connected to the cathode of the diode 66. A negative phase output terminal (Q̄) of the RS-FF 73 is connected to a gate of the NMOS 34. A base of the transistor 63 is connected to a base and collector of the transistor 64. The collector of the transistor 64 is connected to the determination circuit 80.

As shown in FIG. 1, the determination circuit 80 comprises a regulator 81 whose input terminal is connected to the node N1, three PNP type transistors 82, 83, and 84, a light receiving element 85 constituted by a photo transistor or the like, NPN type transistors 86 and 87, a constant current source 88, a comparator 89, and a power source 90.

Emitters of the three PNP type transistors 82, 83, and 84 are connected to an output terminal of the regulator 81. A collector of the transistor 82 is connected to bases of the transistors 82 to 84, and is also connected to one end of the light receiving element 85. The other end of the light receiving element 85 is connected to the input terminal IN2.

A collector of the transistor 83 is connected to a collector and base of the NPN type transistor 86, and to a base of the NPN type transistor 87. Emitters of the transistors 86 and 87 are connected to the input terminal IN2. A collector of the transistor 87 is connected to the collector of the transistor 64 in the oscillation circuit 60. A collector of the transistor 84 is connected to an input terminal of the constant current source 88, and an output terminal of the constant current source 88 is connected to the input terminal IN2.

A connection point of the collector of the transistor 84 and the constant current source 88 is connected to a noninverting input terminal (+) of the comparator 89. An inverting input terminal (−) of the comparator 89 is connected to the power source 90 which generates a reference voltage by which which of the standby mode and the normal mode is set is determined. An output terminal of the comparator 89 is connected to the other input terminal of the AND gate 47 in the starting circuit 40.

The output circuit 91 and the detection circuit 100 are connected to the secondary winding 32b of the transformer 32.

The output circuit 91 is constituted by a rectified-current smoothing circuit comprising a diode 91a and a capacitor 91b. An anode of the diode 91a is connected to one end of the secondary winding 32b, and a cathode of the diode 91a is connected to an output terminal OUT1, and to one electrode of the capacitor 91b. The other electrode of the capacitor 91b is connected to the other end of the secondary winding 32b, and to an output terminal OUT2. The output terminals OUT1, and OUT2 output a DC output voltage Vout generated by the output circuit 91 to a load (not shown).

The detection circuit 100 comprises resistors 101 and 102 which are serially connected between the output terminal OUT1 and the output terminal OUT2, an error amplifier 103, a light emitting element 104 constituted by a light emitting diode, etc., a resistor 105, a Zener diode 106, and an NPN type transistor 107.

A connection point of the resistor 101 and the resistor 102 is connected to an input terminal of the error amplifier 103. The error amplifier 103 amplifies a difference between a reference voltage (not shown) and a voltage generated by the resistors 101 and 102. One end of the light emitting element 104 is connected to an output terminal of the error amplifier 103. The light emitting element 104 constitutes a photo coupler together with the light receiving element 85. The resistor 105 is connected between the other end of the light emitting element 104 and the output terminal OUT1.

Further, a cathode of the Zener diode 106 is connected to the output terminal of the error amplifier 103, and an anode of the Zener diode 106 is connected to a collector of the NPN type transistor 107. An emitter of the transistor 107 is connected to the output terminal OUT2. A standby signal SB is input to a base of the transistor 107.

Next, an operation of the DC power source apparatus of FIG. 1 will be explained with reference to FIGS. 4(a) to (c), and FIGS. 5(a) to (g). FIGS. 4(a) to (c) are waveform charts for explaining an operation of the starting circuit 40 shown in FIG. 2. FIGS. 5(a) to (g) are waveform charts for explaining an operation of the oscillation circuit 60 shown in FIG. 3.

In the normal mode, i.e., in a state where a standby signal SB is not supplied, the base of the transistor 107 is at "L". In this normal mode when an input voltage Vin is applied to the input terminal IN1, the capacitor 33 is charged with electricity via the starting resistor 31. The speed at which the capacitor 33 is charged depends upon the product of the resistance value of the starting resistor 31 and the capacitance of the capacitor 33, i.e., depends upon a time constant.

When charging of the capacitor 33 goes on, and the voltage of the connection point (node N1) of the capacitor 33 and the starting resistor 31 becomes higher and finally reaches $Vcc_{on1}$ as shown in FIG. 4(a), the comparator 41 of the starting circuit 40 determines that the voltage of the node N1 reaches the reference voltage $Vcc_{on1}$ supplied from the power source 44 by comparing it with $Vcc_{on1}$, and outputs "H". Due to this, an output signal of the OR gate 48 is switched to "H", and the RS-FF 49 is set. When set, the RS-FF 49 outputs "H" from the output terminal Q.

Figure 4:
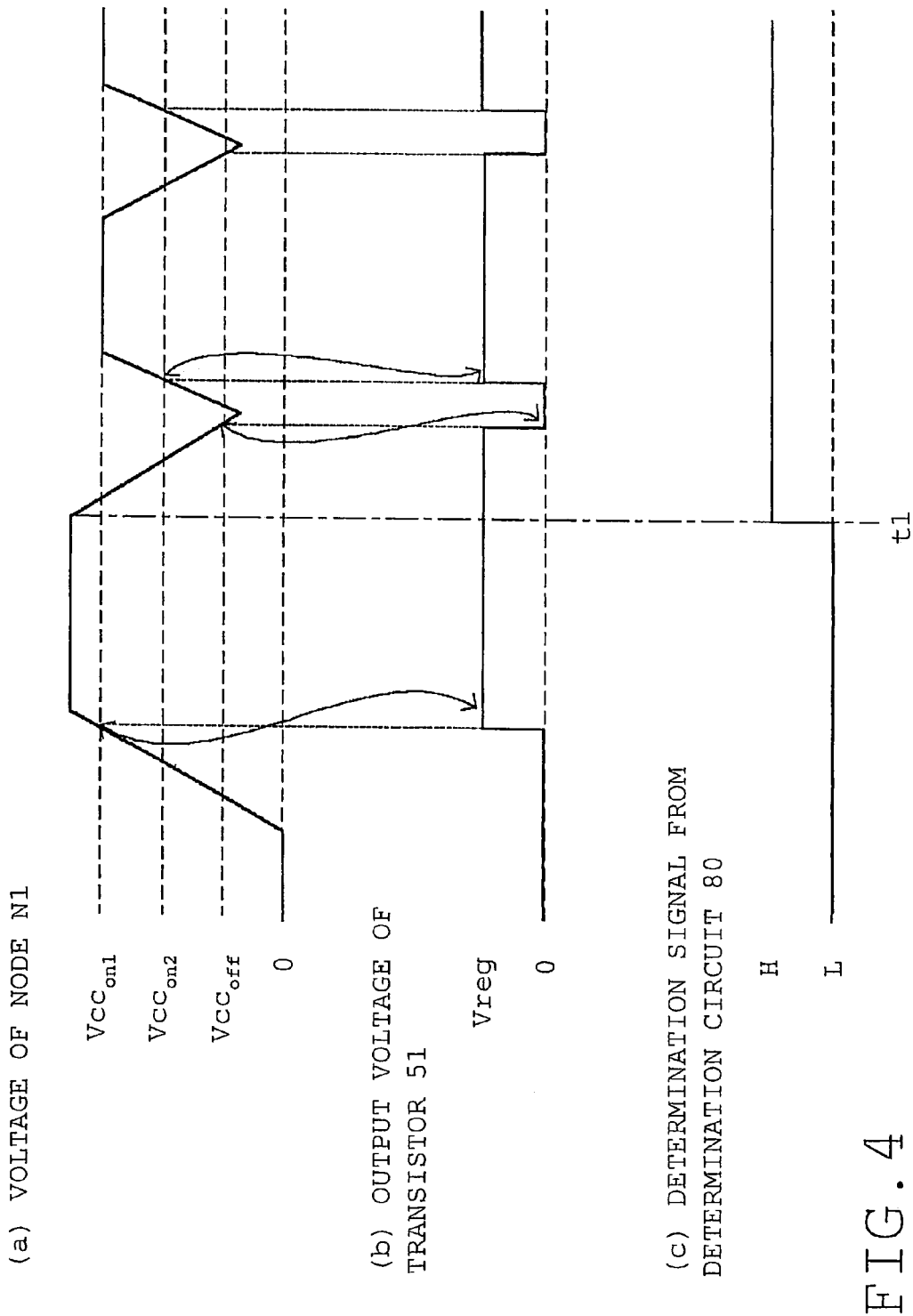
FIGS. 4(a) to (c) are waveform charts for explaining an operation of the starting circuit shown in FIG. 2.

When the RS-FF 49 outputs "H", the base of the transistor 51 is driven to be "H", thereby the transistor 51 is switched on. When switched on, the transistor 51 outputs a voltage Vreg which is almost equal to a Zener voltage of the Zener diode 52 from its emitter as shown in FIG. 4(*b*) and supplies it to the oscillation circuit 60. As a result, power supply to the oscillation circuit 60 is started.

Figure 5:
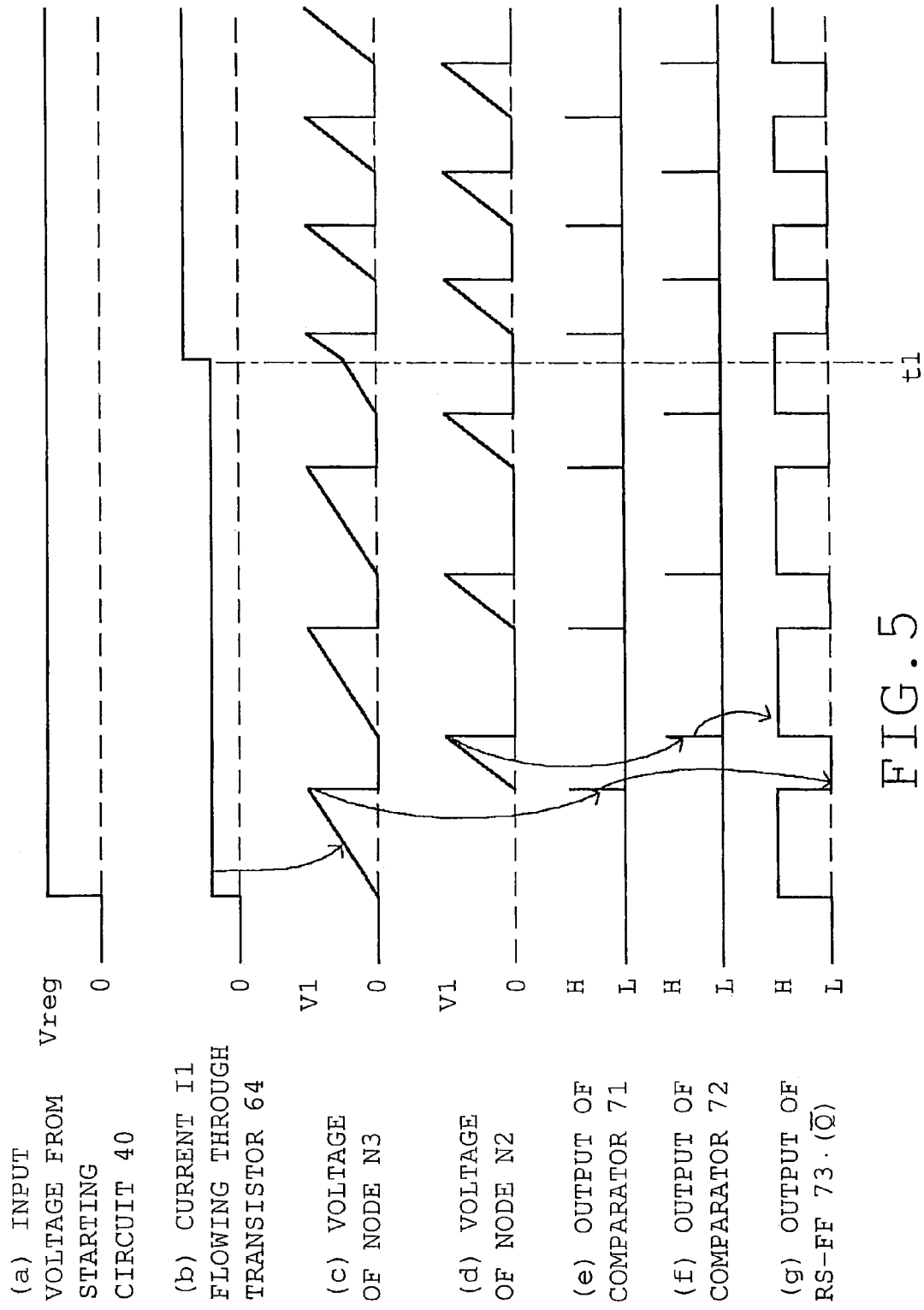
FIGS. 5(a) to (g) are waveform charts for explaining an operation of the oscillation circuit shown in FIG. 3.

When the voltage Vreg is applied to the oscillation circuit 60 (see FIG. 5(*a*)), and thereby electricity is supplied thereto, the RS-FF 73 is initialized into the reset state. When reset, the RS-FF 73 outputs "L" from the positive phase output terminal (Q), and outputs "H" from the negative phase output terminal ($\overline{Q}$). When the negative phase output terminal ($\overline{Q}$) outputs "H", the gate of the NMOS 34 is driven to be "H", thereby the NMOS 34 is switched on. The capacitor 65 discharges via the diode 66, and the voltage of the node N2 becomes almost zero.

In the meantime, the resistors 62 and 70 divide the voltage input from the transistor 51, and generate a voltage V1. Then, when a current 11 which corresponds to a later-described feedback signal FB flows through the transistor 64 (see FIG. 5(*b*)), a current having almost the same intensity as that of the current 11 flows through the transistor 63, and charges the capacitor 69. When the capacitor 69 is charged and the voltage of the connection point (node N3) of the transistor 63 and the capacitor 69 reaches V1 as shown in FIG. 5(*c*), the comparator 71 detects that the voltage of the node N3 reaches V1, and outputs "H" as shown in FIG. 5(*e*). As a result, the RS-FF 73 is set.

When set, the RS-FF 73 outputs "H" from the positive phase output terminal (Q), and outputs "L" from the negative phase output terminal ($\overline{EQ}$) as shown in FIG. 5(*g*). Due to this, the NMOS 34 is switched off. Further, the transistor 68 is turned on, the capacitor 69 discharges, and the voltage of the node N3 becomes almost zero.

Afterwards, the constant current source 61 charges the capacitor 65. When the capacitor 65 is charged and the voltage of the connection point (node N2) of the capacitor 65 and the constant current source 61 reaches the voltage V1 as shown in FIG. 5(*d*), the comparator 72 detects that the voltage of the node N2 reaches the voltage V1, and outputs "H" as shown in FIG. 5(*f*). As a result, the RS-RR 73 is reset. When the RS-FF 73 is reset, the NMOS 34 is turned on again. Thereafter, the same operation is repeated, and the NMOS 34 is turned on and off repeatedly.

When the current flowing through the transistor 64 changes, for example, the intensity of the current increases, the time required for charging the capacitor 69 is shortened, and the NMOS 34 is switched off earlier. By this control, the DC output voltage Vout is kept at a constant value.

The NMOS 34 flows a current through the primary winding 32*a* of the transformer 32 when it is turned on, and cuts the current flowing through the primary winding 32*a* when it is turned off. As a result, a voltage is generated in the secondary winding 32*b* and the tertiary winding 32*c*. The diode 91*a* which is connected to the secondary winding 32*b* rectifies the voltage supplied from the secondary winding 32*b*, and the capacitor 91*b* smoothes the rectified voltage and generates the DC output voltage Vout to be supplied to the load. The diode 35 which is connected to the tertiary winding 32*c* rectifies the voltage supplied from the tertiary winding 32*c*, and the capacitor 33 is charged with the rectified voltage.

The resistors 101 and 102 generate a voltage which is proportional to the DC output voltage Vout to the connection point of them. The error amplifier 103 flows a current having an intensity substantially proportional to a difference between the voltage generated by the resistors 101 and 102 and the reference voltage (not shown) through the resistor 105 and the light emitting element 104. As a result, the light emitting element 104 emits light. When the light emitting element 104 emits light, the light receiving element 85 receives this light, and flows a current having an intensity determined by the value of the DC output voltage Vout, i.e., the feedback signal FB.

As a result, a current having an intensity proportional to the feedback signal FB flows through the transistors 83 and 86. Then, the current 11 having an intensity proportional to the feedback signal FB flows through the transistor 87 and the transistor 64 in the oscillation circuit 60.

When a standby signal SB which is at "H" is input to the base of the transistor 107, the DC power source apparatus changes to a standby mode.

For example, when a standby signal SB is input at a time t1 shown in FIGS. 4 and 5, the transistor 107 is turned on. When the transistor 107 is turned on, the Zener diode 106 reaches breakdown, and the voltage of the output terminal of the error amplifier 103 becomes almost equal to the breakdown voltage of the Zener diode 106. Due to this, the intensity of a current flowing through the light emitting element 104 is locked, and the light emitting element 104 emits light having an intensity corresponding to the intensity of the current. The light receiving element 85 receives the light emitted by the light emitting element 104, and flows a feedback signal FB representing the intensity of the received light through the transistor 82. This feedback signal FB has an intensity indicating that a standby signal SB has been input.

In the standby mode, a current having an intensity proportional to the intensity of the feedback signal FB indicating that a standby signal SB has been input flows through the transistor 63 of the oscillation circuit 60, and charges the capacitor 69. And a current having an intensity proportional to the intensity of this feedback signal FB flows through the transistor 84. As a result, the voltage of the noninverting input terminal (+) of the comparator 89 rises, and the comparator 89 outputs "H" as a signal and supplies it to the AND gate 47 of the starting circuit 40. This signal output from the comparator 89 is a determination signal representing that the standby mode is set (see FIG. 4(*c*)).

If the DC power source apparatus is set to the standby mode at the time t1, the amount of the current 11 flowing through the transistor 64 becomes larger after the time t1 than when the DC power source apparatus is set to the normal mode where no standby signal SB is input. Therefore, as shown in FIG. 5(*c*), the speed at which the capacitor 69 is charged becomes higher, and thus the speed at which the voltage of the node N3 rises becomes higher, the timing at which the RS-FF 73 is set comes earlier, and the period of time during which the NMOS 34 is on becomes shorter. As a result, the amount of a charging current to be supplied to the capacitor 33 from the tertiary winding 32*c* is reduced, and the charging voltage of the capacitor 33 which supplies electricity to the oscillation circuit 60 via the transistor 51 falls. Accordingly, the voltage of the node N1 falls gradually, as shown in FIG. 4(*a*).

When the voltage of the node N1 falls and further falls below the voltage $Vcc_{off}$ generated by the power source 45, the comparator 42 outputs "H" and the RS-FF 49 is reset. When reset, the RS-FF 49 outputs "L" from the output terminal (Q), and turns off the transistor 51. As a result, power supply to the oscillation circuit 60 is stopped as shown in FIG. 4(b). While the power supply is stopped, the oscillation circuit 60 does not turn on or off the NMOS 34.

Since the capacitor 33 is supplied with a charging current from an external power source via the starting resistor 31 even while electricity is not supplied to the oscillation circuit 60, it is charged.

In the standby mode, the comparator 89 outputs "H", and this "H" is supplied to the other input terminal of the AND gate 47. When the capacitor 33 is charged via the starting resistor 31 and the voltage of the node N1 reaches the voltage $Vcc_{on2}$ corresponding to the voltage of the power source 46, the comparator 43 outputs "H". When the comparator 43 outputs "H", the output terminal of the AND gate 47 is switched to "H", and an output signal from the OR gate 48 becomes "H".

When the output signal from the OR gate 48 becomes "H", the RS-FF 49 is set and the transistor 51 is turned on. When the transistor 51 is turned on, electricity is supplied to the oscillation circuit 60 again, and the NMOS 34 is turned on and off by the oscillation circuit 60. During the period of time in which the standby signal SB is input, the above described operation is repeated, and the DC output voltage Vout to be supplied to the load becomes lower than that of the normal mode.

Next, effects of the DC power source apparatus according to the present embodiment will be explained. FIGS. 6(a) to (d) are waveform charts showing changes of the DC output voltage.

In the normal mode, the voltage of the node N1 does not become equal to or lower than $Vcc_{off}$, and the DC output voltage Vout is controlled to be the voltage $V_{out1}$, and thus becomes constant.

Figure 6:
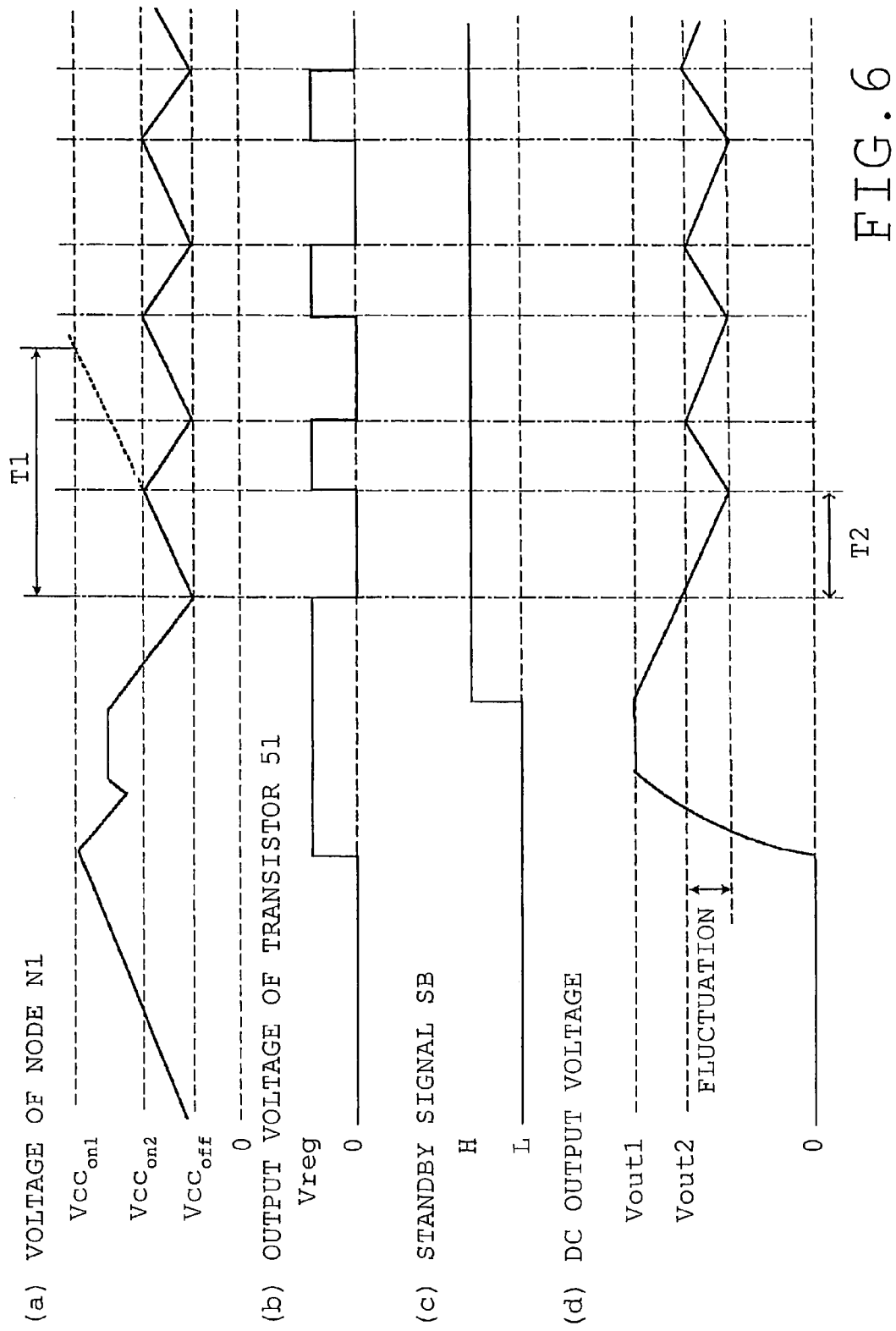
FIGS. 6(a) to (d) are waveform charts showing changes of a direct current output voltage.

Contrarily, when the standby signal SB which is at "H" is input as shown in FIG. 6(c), the voltage of the node N1 lowers and reaches $Vcc_{off}$ as shown in FIG. 6(a), and the DC output voltage Vout also lowers as shown in FIG. 6(d). However, when the capacitor 33 is charged by the starting resistor 31 and the voltage of the node N1 reaches $Vcc_{on2}$, the RS-FF 49 is set, and the power supply to the oscillation circuit 60 is resumed (see FIG. 6(b)). Due to this, the NMOS 34 resumes repeatedly being on and off, and thus the DC output voltage Vout rises.

A time period T2 required for the voltage of the node N1 to change from $Vcc_{off}$ to $Vcc_{on2}$ is shorter than a time period T1 required for the voltage of the node N1 to change from $Vcc_{off}$ to $Vcc_{on1}$. Therefore, when compared to a configuration where the NMOS 34 resumes being turned on and off when the voltage of the node N1 reaches $Vcc_{on1}$, the DC output voltage Vout falls less frequently, and fluctuation of the DC output voltage Vout in the standby mode is reduced more.

Second Embodiment

The DC power source apparatus according to the first embodiment is an example of an isolation type DC power source apparatus employing a transformer. However, the present invention can be applied to a non-isolation type DC power source apparatus. Non-isolation type DC power source apparatuses include several types such as a step-up converter type, a step-down converter type, a polarity inverting type, etc. With any type, if it has a normal mode and a standby mode where the output voltage becomes lower than the normal mode, it is possible to reduce fluctuation of the DC output voltage in the standby mode by applying the present invention. The following will explain a second embodiment of the present invention where the present invention is applied to a non-isolation type DC power source apparatus.

Figure 7:
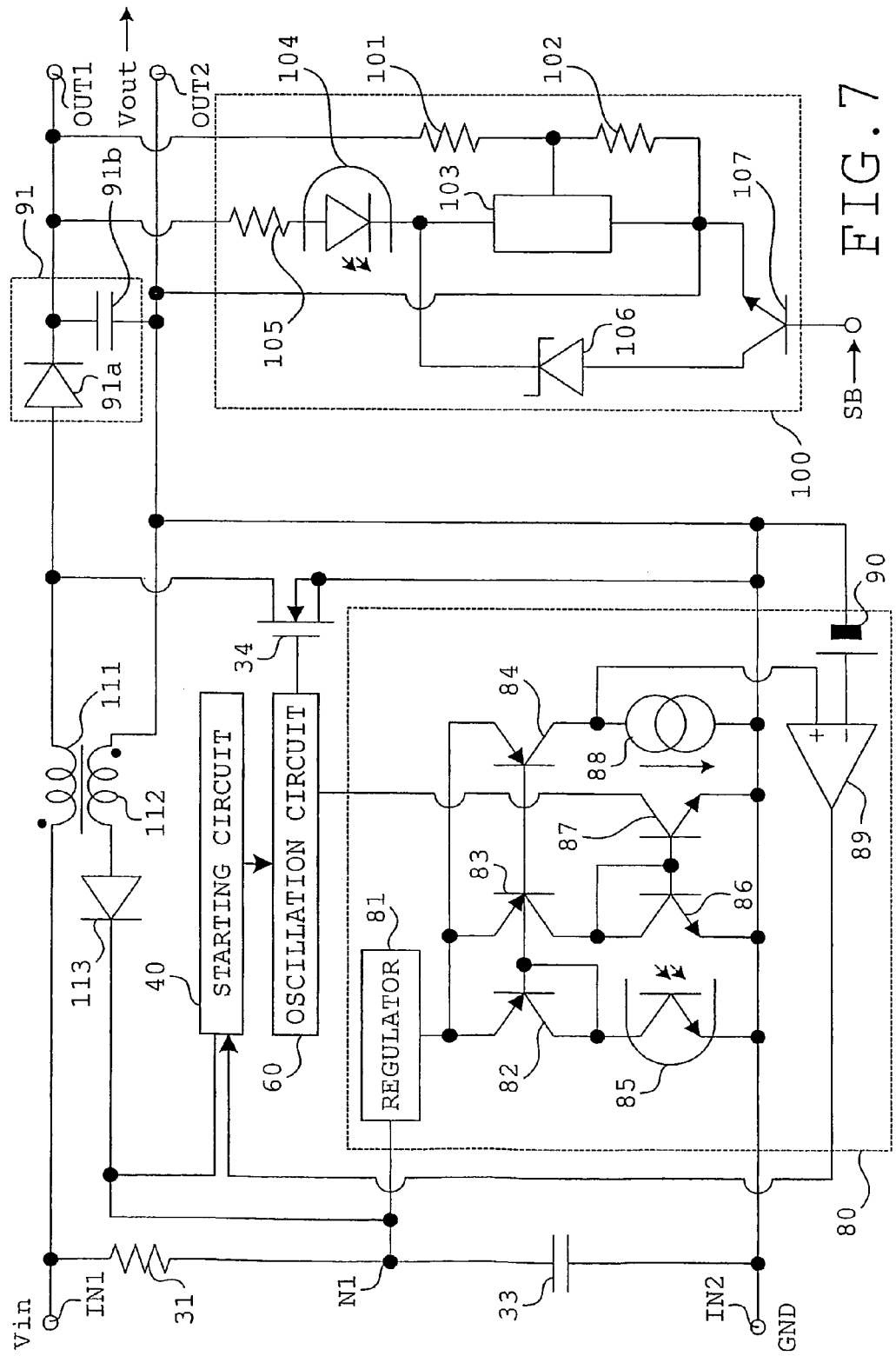
FIG. 7 is a diagram showing a structure of a direct current power source apparatus according to a second embodiment of the present invention.
Figure 8:
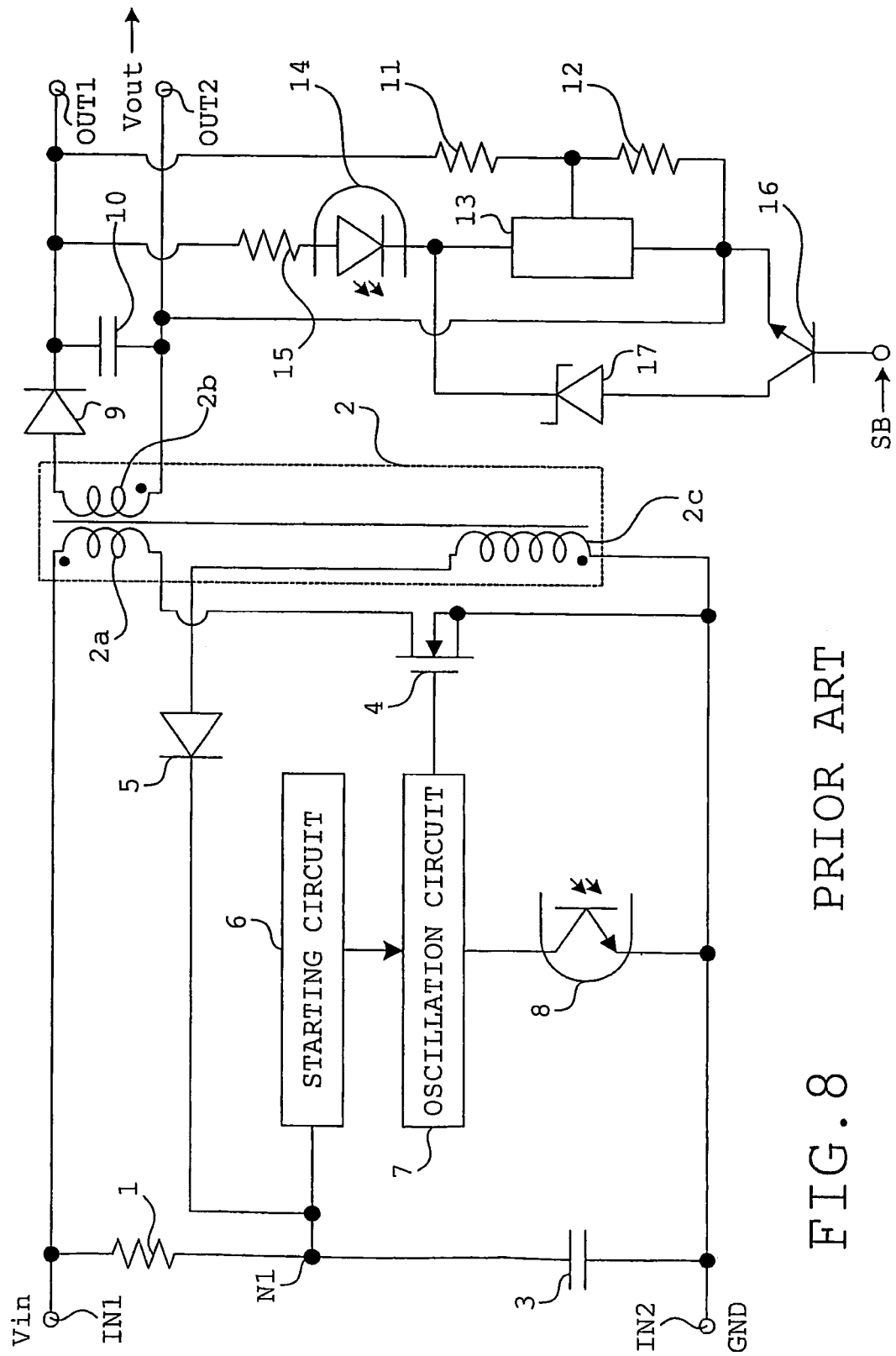
FIG. 8 is a diagram showing an example of a structure of a conventional direct current power source apparatus.
Figure 9:
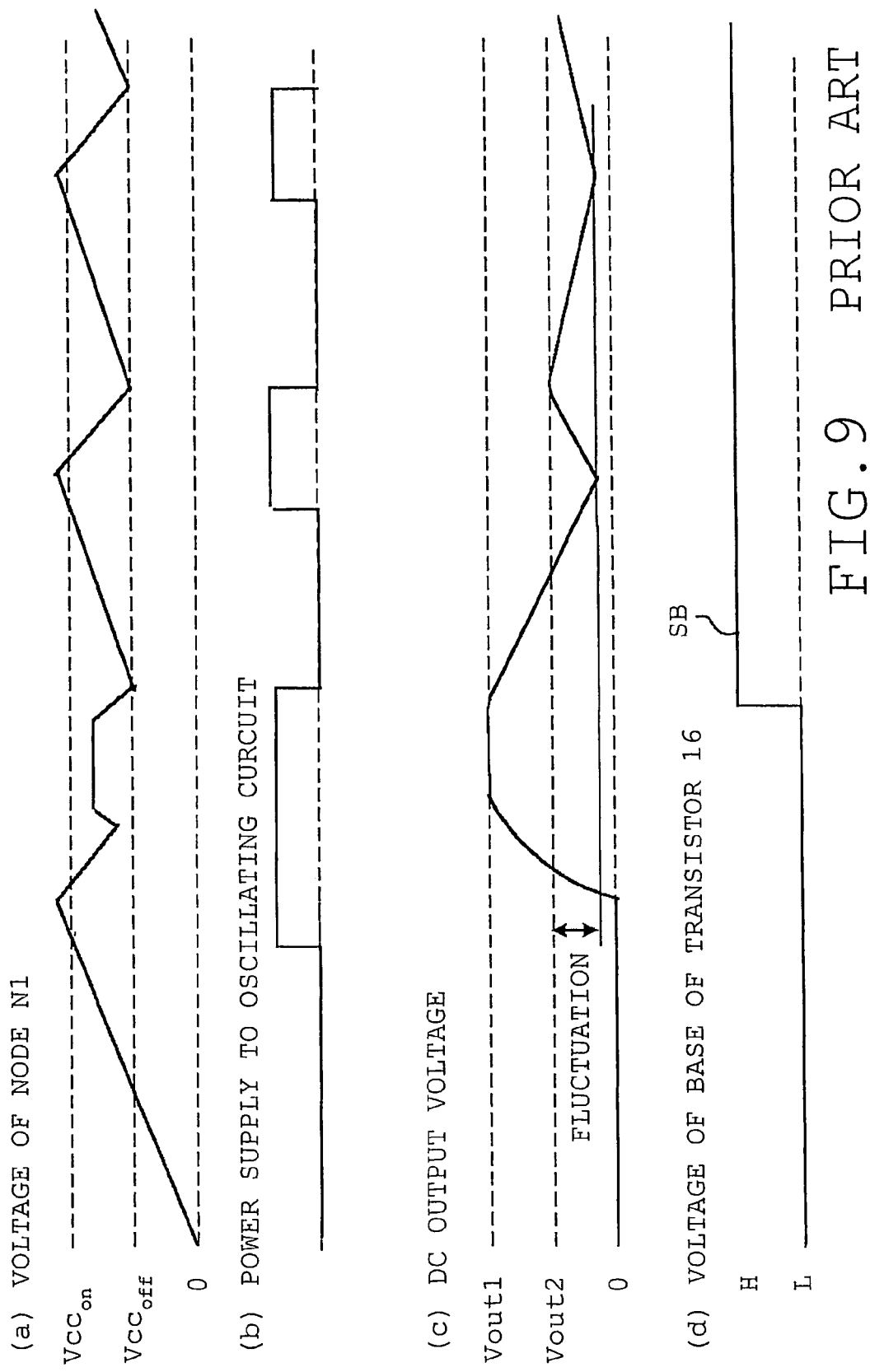
FIGS. 9(a) to (d) are time charts showing an operation of FIG. 8.

FIG. 7 is a diagram showing a structure of a DC power source apparatus according to the second embodiment of the present invention. In FIG. 7, elements same as those in FIG. 1 are denoted by the same reference numerals.

The step-up converter type DC power source apparatus shown in FIG. 7 comprises a coil 111 for storing energy instead of the transformer 32, an auxiliary coil 112 which is inductively coupled to the coil 111, and a diode 113. Further, this DC power source apparatus comprises a starting resistor 31, an NMOS 34, a capacitor 33, a starting circuit 40, an oscillation circuit 60, a determination circuit 80, an output circuit 91, and a detection circuit 100 which are substantially the same as those of the first embodiment.

One end of the coil 111 is connected to the input terminal IN1, and the other end of the coil 111 is connected to the drain of the NMOS 34, and to anode of the diode 91a of the output circuit 91. One end of the auxiliary coil 112 is connected to the input terminal IN2. The other end of the auxiliary coil 112 is connected to an anode of the diode 113, and a cathode of the diode 113 is connected to the node N1. The output terminal OUT2 is connected to the input terminal IN2. Other connections are the same as those in FIG. 1.

In the DC power source apparatus shown in FIG. 7, energy is stored in the coil 111 when the NMOS 34 is on, and a current derived from this energy and a power source current flow through the diode 91a when the NMOS 34 is off. As a result, a DC output voltage Vout which is higher than an input voltage is generated. A current caused in the auxiliary coil 112 is rectified by the diode 113, and supplied to the node N1. The capacitor 33 is charged with this current. The capacitor 33, the starting circuit 40, the oscillation circuit 60, the determination circuit 80, the output circuit 91, and the detection circuit 100 work substantially in the same way as that explained in FIG. 1.

In the DC power source apparatus shown in FIG. 7 too, in the normal mode, the DC output voltage Vout is controlled to be a constant value. On the other hand, in a case where a standby signal SB is input, the voltage of the node N1 lowers to $Vcc_{off}$, and the DC output voltage Vout lowers. Then, when the voltage of the node N1 reaches $Vcc_{on2}$, power supply to the oscillation circuit 60 is resumed, thereby to resume repetition of turning on and off of the NMOS 34. Therefore, the DC output voltage Vout rises.

Further, in the DC power source apparatus shown in FIG. 7 too, a time period T2 required for the voltage of the node N1 to change from $Vcc_{off}$ to $Vcc_{on2}$ is shorter than a time period T1 required for the voltage of the node N1 to change from $Vcc_{off}$ to $Vcc_{on1}$. Accordingly, when compared to a configuration where the NMOS 34 resumes being turned on and off when the voltage of the node N1 reaches $Vcc_{on1}$, the DC output voltage Vout falls less frequently, and fluctuation of the DC output voltage Vout in the standby mode is reduced more.

The present invention is not limited to the above described embodiments, but can be variously modified. As examples of modification, the followings are possible.

(1) The DC power source apparatus according to the first and second embodiments comprises the detection circuit 100, in order to accurately keep the DC output voltage Vout constant. However, the present invention can be applied to a DC power source apparatus which does not have a structure for feed-backing information representing a DC output voltage.

(2) In the DC power source apparatus according to the first and second embodiments, the determination circuit 80 determines whether or not a standby signal SB is input, using a feedback signal FB. However, the standby signal SB may be directly input to the AND gate 47 of the starting circuit 40. With this structure, the determination circuit 80 can be omitted.

As described above, according to the present invention, it is possible to reduce fluctuation of the DC output voltage even in the standby mode.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This patent application claims the Paris Convention Priority based on Japanese Patent Application No. 2002-4490 filed with the Japan Patent Office on Jan. 11, 2002, the complete disclosure of which is hereby incorporated by reference.

INDUSTRIAL APPLICABILITY

The present invention relates to a power source apparatus such as a DC-DC converter, which is applied to electrical/electronic equipment.

The invention claimed is:

1. A power source apparatus comprising: a conversion circuit (40, 60, 34, 32, 91, 100, 80) which performs conversion of an input voltage into an output voltage different from the input voltage; and a driving power source (33) which is charged with the input voltage to drive said conversion Circuit (40, 60, 34, 32, 91, 100, 80),
wherein: said conversion circuit (40, 60, 34, 32, 91, 100, 80) includes
a transformer (32a, 32b) which has a primary winding and a secondary winding which are inductively coupled to each other,
a switching circuit (40, 60, 34, 80) which applies the input voltage to said primary winding intermittently,
a rectifier circuit (91) which rectifies a voltage which is induced in said secondary winding,
a detection circuit (100) which detects that a standby signal is supplied, and supplies a detection signal representing a detection result to said switching circuit (40, 60, 34, 80) via a predetermined signal line; and
a feedback circuit (104, 105) which generates a feedback signal comprising a current that increases as the output voltage increases, and which supplies the generated feedback signal to said switching circuit (40, 60, 34, 80) via said signal fine;
said switching circuit (40, 60, 34, 80) determines whether or not said detection circuit (100) supplies the detection signal representing that the standby signal is detected;
in a case where determining that the standby signal is not detected, said switching circuit (40, 60, 34, 80) starts applying the input voltage intermittently when a voltage of said driving power source (33) rises to a first turn-on voltage, stops applying the input voltage when the voltage of said driving power source (33) lowers to a predetermined turn-off voltage, and sets timings of intermittence of the input voltage based on the feedback signal so that the output voltage may be stabilized at a predetermined first value; and
in a case where determining that the standby signal is detected, said switching circuit (40, 60, 34, 80) stabilizes the output voltage at equal to or lower than a predetermined second value which is lower than the first value, by starting applying the input voltage intermittently when the voltage of said driving power source (33) rises to a second turn-on voltage which is lower than the first turn-on voltage and higher than the turn-off voltage, and by stopping applying the input voltage when the voltage of said driving power source (33) lowers to the turn-off voltage.

2. The power source apparatus according to claim 1, wherein: said detection circuit (100) supplies the feedback signal as the detection signal, by controlling said feedback circuit (104, 105) so that a value represented by the feedback signal may be a predetermined value,
in response to that the standby signal is supplied; and
said switching circuit (40, 60, 34, 80) determines whether or not said detection circuit (100) detects the standby signal, based on the value represented by the feedback signal.

3. The power source apparatus according to claim 1, further comprising:
a tertiary winding (32c) which is inductively coupled to said primary winding; and
an auxiliary rectifier circuit (35) which rectifies a voltage induced in said tertiary winding (32c),
wherein said driving power source (33) is also charged with a voltage obtained by rectification by said auxiliary rectifier circuit (35).

4. A power source apparatus comprising:, a conversion circuit (40, 60, 34, 32, 91, 100, 80) which performs conversion of an input voltage into an output voltage different from the input voltage; and a driving power source (33) which is charged with the input voltage to drive said conversion circuit (40, 60, 34, 32, 91, 100, 80),
wherein: said conversion circuit (40, 60, 34, 32, 91, 100, 80) includes
a coil (111),
a switching circuit (40, 60, 34, 80) which applies the input voltage to said coil (111) intermittently,
a rectifier circuit (91) which rectifies a voltage induced in said coil (111),
a detection circuit (100) which detects that a standby signal is supplied, and supplies a detection signal representing a detection result to said switching circuit (40, 60, 34, 80) via a predetermined signal line; and
a feedback circuit (104, 105) which generates a feedback signal comprising a current that increases as the output voltage increases, and which supplies the generated feedback signal to said switching circuit (40, 60, 34, 80) via said signal line;
said switching circuit (40, 60, 34, 80) determines whether or not said detection circuit (100) supplies the detection signal representing that the standby signal is detected;
in a case where determining that the standby signal is not detected, said switching circuit (40, 60, 34, 80) starts applying the input voltage intermittently when a voltage of said driving power source (33) rises to a first turn-on voltage, stops applying the input voltage when the voltage of said driving power source (33) lowers to a predetermined turn-off voltage, and sets timings of intermittence of the input voltage based on the feedback signal so that the output voltage may be stabilized at a predetermined first value; and in a case where determining that the standby signal is detected, said switching circuit (40, 60, 34, 80) stabilizes the output voltage at equal to or lower than a predetermined second value which is lower than the first value, by starting applying the input voltage intermittently when the voltage of said driving power source (33) rises to a second turn-on voltage which is lower than the first turn-on voltage and higher than the turn-off voltage, and by stopping applying the input voltage when the voltage of said driving power source (33) lowers to the turn-off voltage.

5. The power source apparatus according to claim 4, wherein: said detection circuit (100) supplies the feedback signal as the detection signal, by controlling said feedback circuit (104, 105) so that a value represented by the feedback signal may be a predetermined value, in response to that the standby signal is supplied; and said switching circuit (40, 60, 34, 80) determines whether or not said detection circuit (100) detects the standby signal, based on the value represented by the feedback signal.

6. The power source apparatus according to claim 4, further comprising:

an auxiliary coil (112) which is inductively coupled to said coil (111); and an auxiliary rectifier circuit (113) which rectifies a voltage induced in said auxiliary coil (112), wherein said driving power source (33) is also charged with a voltage obtained by rectification by said auxiliary rectifier circuit (113).

* * * * *